May 24, 1966        G. H. CONLEY        3,252,867

LONG LIFETIME NUCLEAR REACTOR

Filed June 26, 1964        5 Sheets-Sheet 5

INVENTOR
George H. Conley
BY
ATTORNEY

United States Patent Office 3,252,867
Patented May 24, 1966

3,252,867
LONG LIFETIME NUCLEAR REACTOR
George H. Conley, Pittsburgh, Pa., assignor, by mesne assignments, to the United States of America as represented by the United States Atomic Energy Commission
Filed June 26, 1964, Ser. No. 378,407
13 Claims. (Cl. 176—18)

The present invention relates generally to heterogeneous nuclear reactor constructions and more particularly to nuclear reactor arrangements capable of yielding large predetermined amounts of energy over long lifetimes without the necessity of refueling.

In its more specific aspects, this invention relates to the construction of heterogeneous nuclear reactor cores of the seed-blanket type wherein fissile and fertile nuclear fuels are segregated in the reactor core in a predetermined manner and wherein the relative concentrations of fissile and fertile materials are chosen to produce a controlled chain reaction in the reactor core at a predetermined power level for substantially extended lifetimes.

In the area of heterogeneous nuclear reactors, a reactor of the seed-blanket type has been quite prominent as a power producing reactor. In the Shippingport Atomic Power Station at Shippingport, Pennsylvania, the first central station power reactor capable of producing large amounts of power was constructed having a seed of highly enriched uranium ($U^{235}$) and a blanket of natural uranium ($U^{238}$). The seed portion was generally annular in configuration and the natural uranium blanket comprised both a central region within the seed and an outer annulus surrounding the seed.

In the Shippingport Atomic Power Station, as well as for any nuclear reactor, the limitation on the operation of the reactor is determined by the excess reactivity of the reactor at any point during the lifetime of the reactor core. More particularly, the excess reactivity built into the reactor core cannot exceed the control capability of the reactor control system. Thus, an obvious limitation on any reactor comprises the amount of excess reactivity that is controllable by the reactor control system. It is to be realized that typical excess reactivity values which are controllable with one or more present day control methods are on the order of 0.10 to 0.30 $\Delta K_{eff}$ (maximum excess reactivity at equilibrium operation). In the Shippingport Station, it was determined that the maximum excess reactivity during a seed lifetime occurred at the beginning of life. The excess reactivity decreases monotonically with the lifetime (i.e. as the seed life increased, the excess reactivity decreased). As a result, the seed lifetime is determined for the Shippingport seed-blanket reactor by that period in life wherein the excess reactivity of the reactor core is between the maximum controllable excess reactivity (beginning of life) and zero (end of life).

The other extreme of a mixed fuel power reactor comprises what is known in the art as a "slightly enriched" reactor. A slightly enriched reactor can be viewed as a seed-blanket reactor having a seed approaching zero thickness. In other words, the slightly enriched reactor includes a uniform distribution of enriched uranium or other fissile fuel (usually from 1 to 6% of the total fuel) throughout the reactor core. The slightly enriched reactor also exhibits its maximum excess reactivity in the beginning of life with the excess reactivity decreasing monotonically with lifetime.

In the Shippingport seed-blanket reactor, one relatively thick annular seed was utilized and the maximum excess reactivity occurred at the beginning of life. In the slightly enriched reactor where, in effect, a seed of zero thickness is utilized, the maximum excess reactivity also occurs at the beginning of life. Thus, the effect of providing a reactor construction having its maximum excess reactivity at the beginning of life is duplicated for both thick seed and the zero thickness seed cases.

In accordance with the invention, the amount of such excess reactivity, together with the ratio of fissile to fertile fuel, the positioning of such fuel, and the seed thickness are directly determinative of the lifetime of the reactor. In practicing the principles of this invention, it will be seen that it is desirable to vary the above-described quantities to certain optimum conditions wherein the effects of such optimization is the provision of an operational, long-lived reactor. For example, it is desired to have an optimum fissile to fertile fuel ratio. In addition, it is necessary to provide a geometry wherein an optimum ratio of fissile seed nuclei to fertile blanket nuclei results with the seed having an effective thickness within predetermined values. By following the principles of this invention, the amount of control built into a reactor to accommodate the maximum reactivity swing will be reduced for any given initial loading of fissile material. Thus, a larger initial loading of fissile material for a given control swing is permitted. For any given loading of fissile material, the lifetime of the reactor core can be maximized by following the teachings of this invention.

Accordingly it is an object to maximize the energy obtainable from a given loading of fissile fuel in a seed-blanket reactor.

It is another object of this invention to provide a neutronic reactor of the seed-blanket type having a seed thickness sized to provide an extended lifetime for the reactor core.

A further object of this invention is to provide a new and improved neutronic reactor of the seed-blanket type wherein the fissile and fertile fuel materials are chosen and are positioned within the reactor core in a predetermined manner to produce an extended core lifetime.

Another object is to provide a neutronic reactor core arrangement capable of accommodating a predetermined maximum reactivity swing during its lifetime wherein the said arrangement is selected and fueled with fissile and fertile material so as to maximize the reactor core lifetime.

Still another object of this invention is to provide a seed-blanket neutronic reactor having an extended lifetime wherein the maximum excess reactivity in the reactor need not occur at the beginning of life.

A still further object of this invention is to provide a new and improved seed-blanket reactor containing initially both fissile and fertile material wherein substantially all of the fissile material is located in the reactor seed and substantially all the fertile material is located in the blanket and wherein the reactor seed is formed of a predetermined thickness and wherein the reactor core has a predetermined ratio of seed material to blanket material to produce a reactor core having an extended lifetime.

In accordance with the invention, fissile material is defined herein as a material which has a high probability of fissioning when absorbing a thermal neutron. Fertile material is defined herein as a material which has a high probability of becoming fissile as a result of absorbing a thermal neutron.

Briefly, the invention accomplishes the above cited objects through the provision of a seed-blanket reactor wherein a long core lifetime is obtained through the proper selection of the seed-thickness, fissile and fertile fuel mass fractions and compositions and a suitable geometric arrangement of the fissile and fertile fuel such that the excess reactivity which occurs during the core lifetime is of an amount which is controllable by one or more of present day control methods. It has been determined that for a seed-blanket reactor having a given fissile to fertile fuel ratio, there is an optimum range of seed thicknesses for every fissile to fertile fuel ratio which produces a reactor having a minimum excess reactivity yet resulting in a core having a lifetime which extends several times as long as the core lifetimes for present day seed-blanket and slightly enriched reactors.

Further objects and advantages of this invention will become apparent as the following description proceeds and features of novelty which characterize the invention will be pointed out in particularity in the claims annexed to and forming a part of this specification.

For a better understanding of this invention, reference may be had to the accompanying drawings, in which:

FIGURES 1A, 1B and 1C each comprises a set of graphs illustrating the effect of seed radius and the effect of the ratio of fissile fuel to total fuel in a neutronic reactor of the seed blanket type on the lifetime and the amount of control needed for such reactors using thorium-232 as the blanket fuel.

Figure 4:
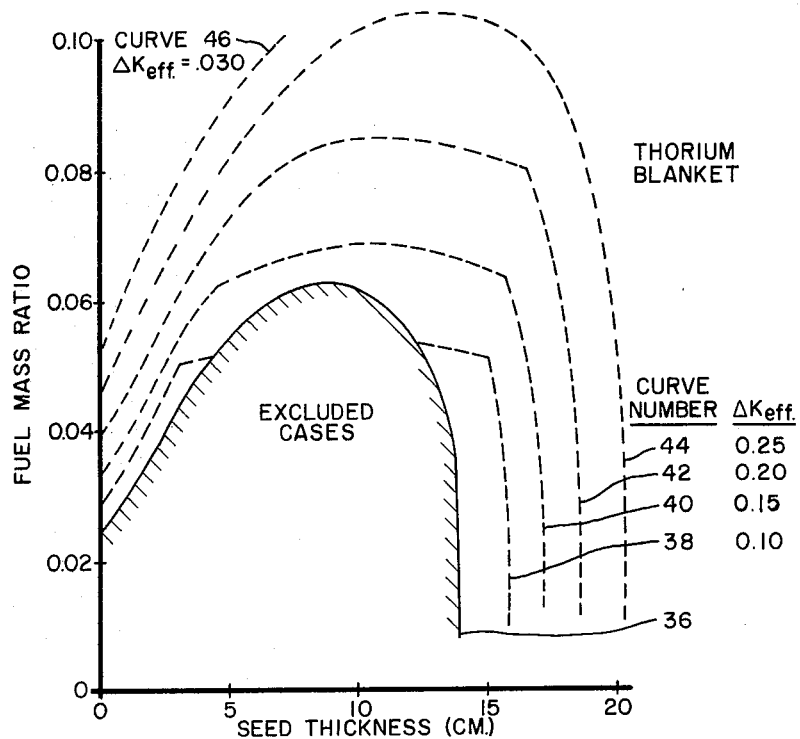
FIG. 4 is a graph showing the influence of seed thickness and the influence of the ratio of fissile fuel to total fuel on the amount of control required by different seed-blanket reactors having thorium-232 fueled blankets.
Figure 5:
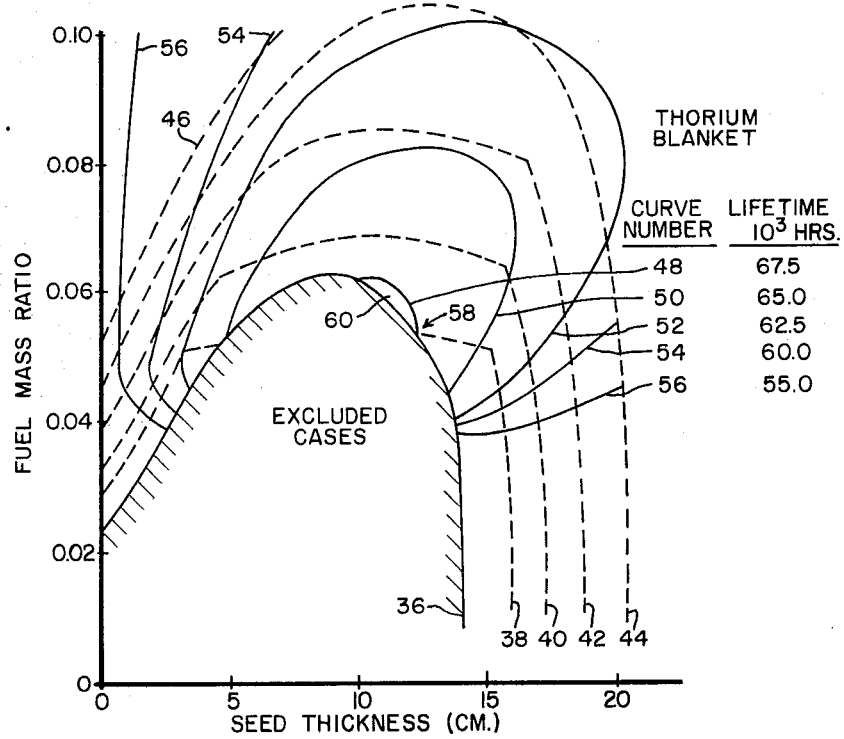
Figure 6:
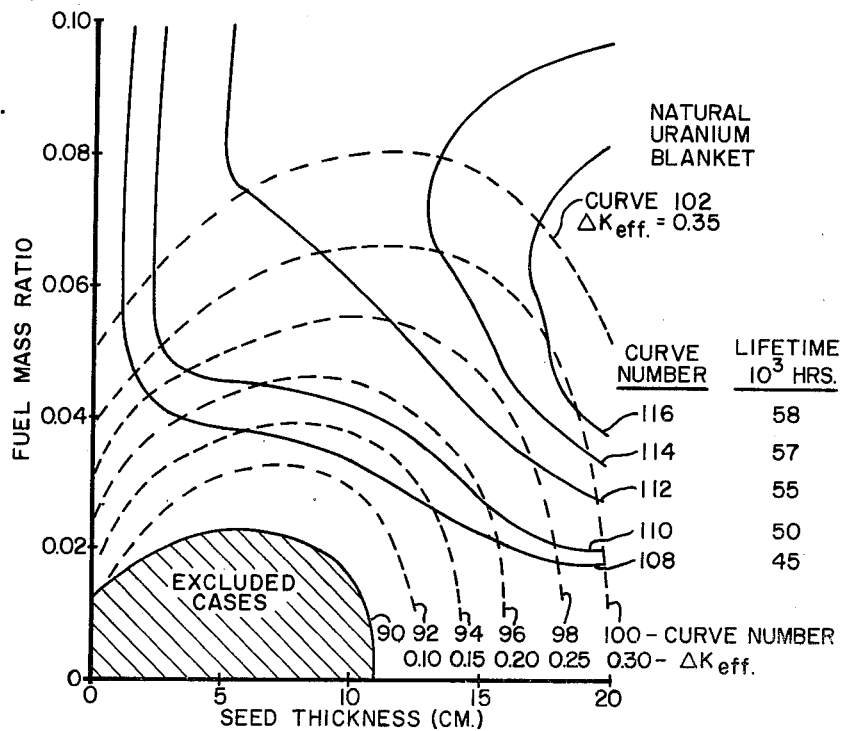
Figure 7:
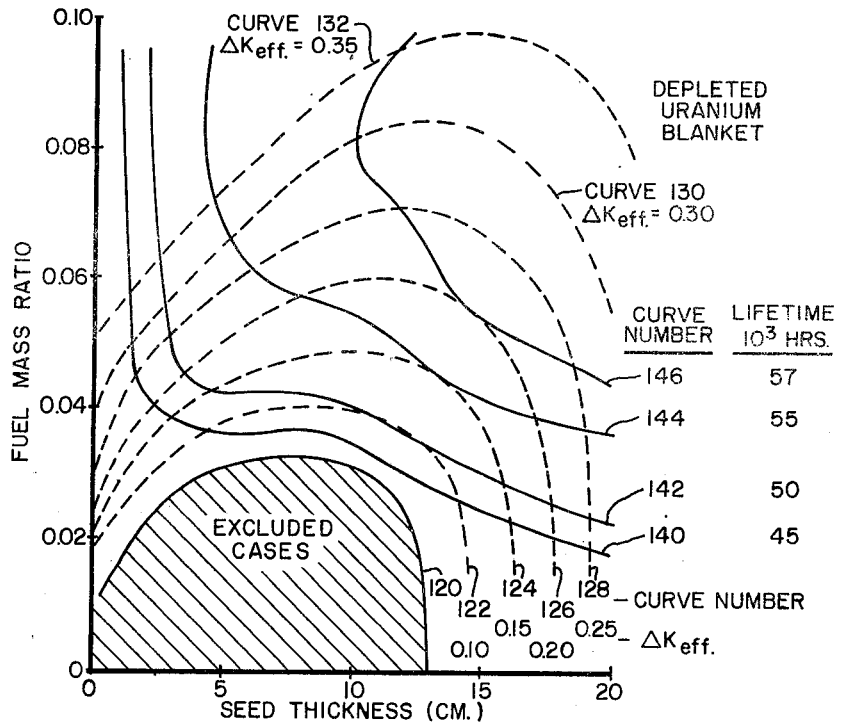
Figure 8:
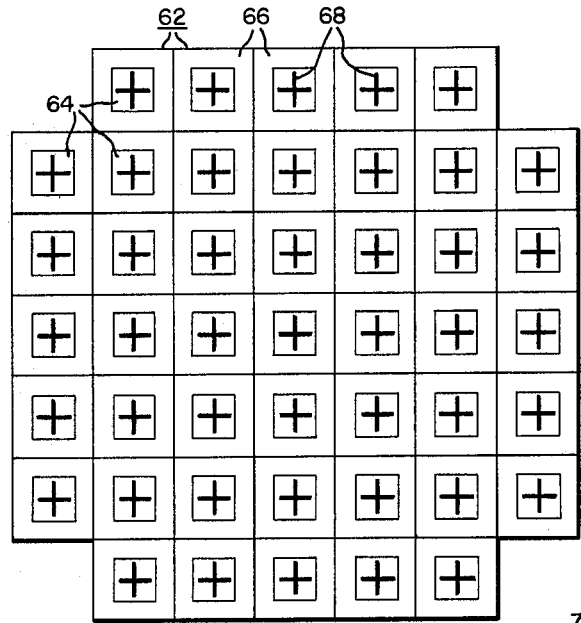
Figure 9:
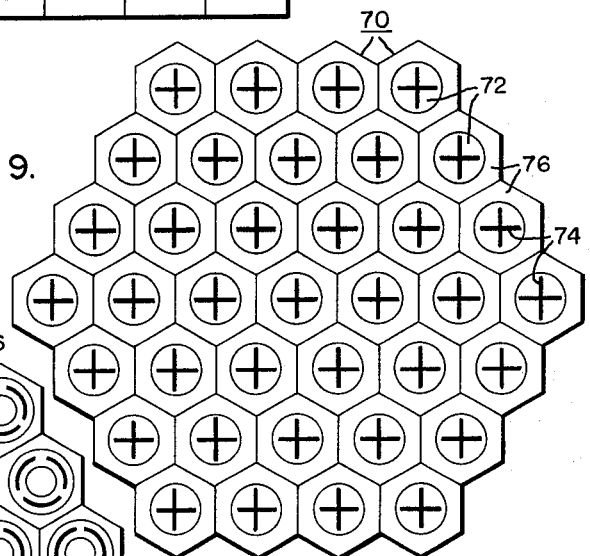
Figure 10:
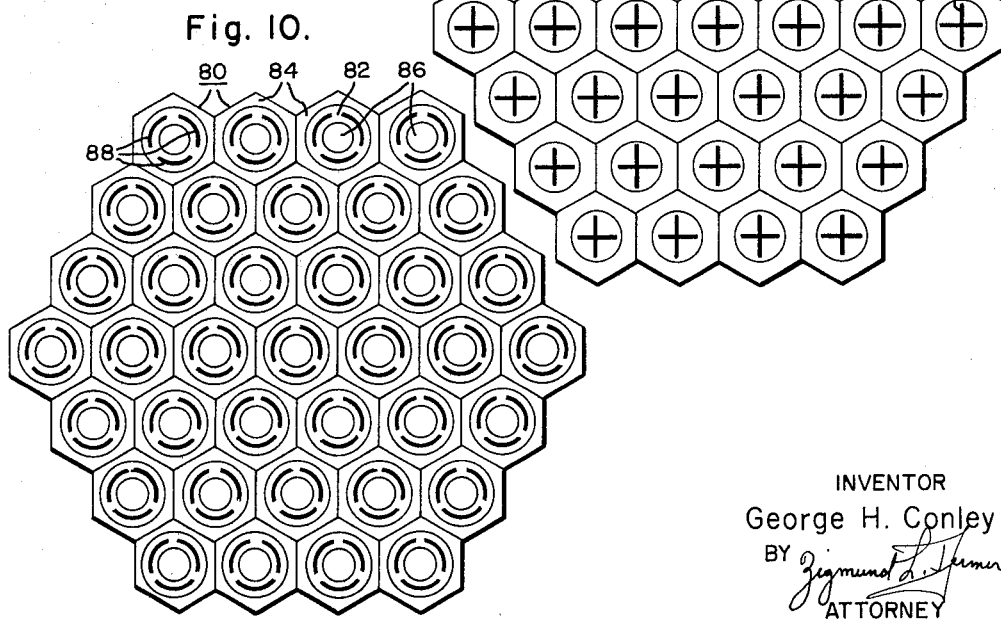

FIG. 5 comprises the graph of FIG. 4 having superimposed thereon loci of constant reactor core lifetimes;

FIG. 6 is a graph similar to the graph of FIG. 5 having the blanket material fueled with natural uranium;

FIG. 7 is a graph similar to the graph of FIG. 5 having the blanket material fueled with depleted uranium; and FIGS. 8, 9 and 10 each represent schematic cross sectional views of seed-blanket reactors constructed in accordance with the principles of this invention.

Fuel arrangements

In considering the instant invention, it is to be realized that all of the materials discussed herein relate to the construction of a seed-blanket reactor wherein there are provided two segregated regions in the reactor core, known respectively as the seed region and the blanket region. The seed region fuel is formed almost entirely with fissile material, for example highly enriched uranium-235 while the blanket fuel is formed almost entirely from a fertile material such as uranium-238 or thorium-232. In considering uranium-238 it is to be realized that naturally occurring uranium is uranium-238 containing approximately 0.7% fissile material (U-235). However, large quantities of natural uranium are processed through diffusion plants to remove the fissile material therefrom. The byproduct of such plants is the uranium-238 having a low fissile content and that byproduct, known as "depleted uranium," contains approximately 0.22% fissile material (U-235). Thus, suitable fertile materials for use in the blanket may comprise either thorium, depleted uranium or natural uranium. The calculations illustrated in FIGS. 1 through 5 have been made considering the blanket region to be formed from natural thorium which is predominately thorium-232 (nearly 100%), while the graphs of FIGS. 6 and 7 use natural uranium and depleted uranium blankets, respectively.

Reactor control considerations

In connection with the invention, it is to be realized that there exists several methods for controlling excess reactivity in a nuclear reactor. Control methods include (1) movable poison rods (known as control rods), (2) fixed burnable poison, (3) moving fuel into and out of the reactor core, (4) varying the concentration of heavy water in light water ($D_2O$ to $H_2O$) in water moderated reactors and (5) homogeneous poison control. In referring to control capability or control swing in connection with the instant invention, reference is being made to the difference in maximum and minimum reactivity of the reactor core at full power. It is known that using the first four control methods described above, there are practical limits on the amount of reactivity swing or control swing available for a given reactor. A number of present day reactors are designed so that the maximum control swing (maximum available excess reactivity at full power equilibrium at any point in life) is on the order of 10% (0.10 $\Delta K_{eff}$). Utilizing any one or more combinations of the first four methods of control, reactors can be designed to have a control swing of up to 30% (0.30 $\Delta K_{eff}$). However, using the homogeneous poison type of control, wherein a poison having a high degree of solubility in a coolant is mixed within the coolant, control swings in excess of 30% (0.30 $\Delta K_{eff}$) may be achieved. It is pointed out however, that, in accordance with the teachings of the invention, the provision of poison control for too great a control swing has an adverse influence on the reactor core lifetime. This is true because poison control actually wastes neutrons by absorbing those neutrons which might otherwise convert fertile to fissile fuel and fission the fissile fuel to produce more energy. In connection with the graphs of FIGS. 1 through 7, a movable poison rod type of control has been assumed (case (1) above). If others of the above-identified types of poison control are utilized or if the concentration of heavy water is varied, only minor variations in the graphs of FIGS. 1 through 5 would occur. If moving fuel control is used, seed thickness should be understood as maximum seed thickness. With moving fuel control it is again possible to choose a maximum seed thickness and a mass ratio which produces a reactor having a minimum excess reactivity yet resulting in extended core lifetime. In this case lifetimes would be comparatively higher since no neutrons are lost to poisons.

Geometrical considerations

As will be described in detail in connection with FIGS. 8 through 10, the invention contemplates the use of a seed-blanket geometry which comprises a middle ground approach between the single seed arrangement of the Shippingport reactor and the slightly enriched or zero seed arrangement. In accordance with the invention, a geometry is chosen wherein the blanket or fertile region of the reactor is exposed as uniformly as possible to the seed in order to get relatively uniform irradiation of the blanket; yet separate seeds and blankets are provided with only the seeds being controlled so that the control advantages associated with a seed-blanket reactor are obtained. To obtain uniform irradiation, the peak to average burnup in the blanket must be minimized. A peak to average burnup in the blanket of less than 2.5 is necessary, while in the FIG. 9 arrangement the peak to average burnup in the blanket is approximately 1.7. A suitable geometry to obtain such uniform irradiation of the blanket comprises the provision of a number of spaced seeds in the reactor core, each having a control means associated therewith, and each seed having a blanket region disposed adjacent thereto for irradiation purposes.

In providing a geometry having a number of spaced seeds, it will be noted that the seeds may be formed of many cross sectional configurations, for example, the squared cross section of FIG. 8, the circular cross section of FIG. 9 or the annular cross section of FIG. 10. Such a geometrical variation of the seed configuration will slightly affect the positioning of the curves of FIGS. 1 through 5, however, all such configurations are within the contemplation of the invention and the principles of the invention which will be pointed out in particularly hereinafter are equally applicable to each cross sectional configuration. In plotting the graphs of FIGS. 1 through 7, however, it is to be realized that a seed arrangement of circular cross sectional configuration (as shown in FIG. 9) was utilized. As a result, all references to the thickness of the seed are made in terms of seed radius for a centrally disposed seed of circular cross section.

In considering the geometry, reference is being made to the "thickness" of the seed. Thus for a circular seed, its thickness is defined as the radius of the circle. For a seed of squared across section, a quantity similar to a radius for a circle but equivalent to the average thickness of the seed from the center of the square comprises the seed thickness. For an annular seed, the seed thickness comprises the difference between the radius of the larger circle of the annulus minus the radius of the smaller circle of the annulus. The substitution of a square seed for the circular seed utilized in the calculations of the graphs of FIGS. 1 through 5 would produce no substantial variation in the graphical illustrations of FIGS. 1 through 5 and while there may exist a small shift in the numeral values of such quantities as mass ratio, lifetime or control swing, such variations would be of a small order.

In performing the calculations resulting in the graphs of FIGS. 1 through 4, the quantity "mass ratio" is utilized. The quantity mass ratio is defined herein to be the ratio of fissile fuel to total fuel wherein total fuel comprises both fissile and fertile fuel. All of the curves of FIGS. 1 through 5 are calculated wherein the same quantity of fissile fuel is utilized. To obtain a variation in the mass ratio, a variation only in the amount of fertile fuel was assumed.

It is to be further realized that the lifetime of a reactor varies monotonically with the fissile fuel inventory in the reactor. In other words as the fissile fuel inventory is increased at a constant mass ratio, the lifetime of the reactor, for operation at any given power level, is increased. In the calculations which resulted in the graphs of FIGS. 1 through 5, a maximum power density (kilowatts per liter) has been assumed for the seeds in all cases. The power output per unit loading of fissile material $$\left(\frac{\text{Megawatts}}{\text{Metric ton } U^{235}}\right)$$

is selected in all examples herein described at 385/mw./m.t. $U^{235}$ Hence, lifetimes calculated are a direct measure of energy obtained per unit loading of fissile material.

Seed parameters

The calculations of FIGS. 1 through 5 were performed with the intention of maximizing lifetime and therefore of maximizing fissile fuel content of the seed. In addition, it is advantageous to minimize the atom ratio of structural material to fuel in the seed regions. Thus, the fissile fuel density in the seed fuel elements was maximized. This density is presently limited by metallurgical considerations to that which can produce approximately $30 \times 10^{20}$ fissions/cc. For a seed formed from uranium-235, this implies an atom density inside the cladding of the seed fuel elements of $37.5 \times 10^{20}$ atoms/cc.

The efficiency of the seed in producing excess neutrons (to be used in the blanket) is sensitive to the ratio of hydrogen atoms to fissile fuel atoms. In the case of a uranium-235 fueled seed, a radio of hydrogen atoms to uranium-235 atoms of 60 to 75 is optimum. For optimum lifetime performance the average lifetime ratio should be in this range.

In the illustrative examples presented in FIGS. 1 through 7, hereof, $37.5 \times 10^{20}$ atoms of uranium-235/cc. inside the cladding of a fuel rod of 0.280 inch in diameter were used. The beginning-of-life hydrogen to uranium-235 ratio was chosen at 30.2. Thus, allowing for necessary structural components of the seed and the water density, the seed metal-to-water volume ratio was 0.75.

Blanket parameters

Respecting the construction of the blanket portion of a reactor core, it has been pointed out that natural uranium containing 0.7% fissile U-235, thorium containing no fissile material or depleted natural uranium may be utilized as the blanket fertile fuel material. Inasmuch as there is an adverse effect upon lifetime and control requirement by the use of a fertile material having a slight fissile enrichment, the calculations utilized in producing the curves of FIGS. 1 through 5 were made on the basis of thorium-232 as the fertile material in the blanket. For the curves of FIGS. 6 and 7, all variables were maintained the same as for FIGS. 1 to 5 except that the blanket material for FIG. 6 is natural uranium and the blanket material for FIG. 7 is depleted uranium.

To obtain long lifetime, the blanket must generate as much power as possible using the neutrons produced in the seed. The efficiency with which this is done is dependent upon the ratio of moderating atoms to fertile fuel atoms. In the specific examples of FIGS. 1 to 5 hereof, the ratio of hydrogen atoms to thorium atoms in the blanket is the important consideration. In the event the hydrogen to thorium ratio is increased from a very low value (for example 0.5), the ratio of power produced to uranium-233 residue produced is increased. At the same time, the parasitic absorption in hydrogen is increased, and for hydrogen to thorium ratios greater than 3, the efficiency with which the blanket uses neutrons from the seed decreases. For a uranium-235 seed, a hydrogen to thorium ratio up to 3.0 will be chosen depending upon the relative value of power and uranium-233 production. A choice of the hydrogen to thorium atom ratio above 4.0 is unlikely. For the illustrative example of the invention described in FIGS. 1 to 5 hereof, the hydrogen to thorium atom ratio of 3.0 was used. For a blanket fuel element comprising a 0.674 inch diameter rod, thorium oxide ($ThO_2$) of 80% density, and water density of 0.76 g./cc., a metal to water ratio in the blanket of 1.29 is implied.

It is to be further realized that all calculations have been made on the basis of a large pressurized water reactor wherein light water ($H_2O$) is utilized both as a coolant and as a moderating material. The neutron leakage from this reaction was assumed to be 2% corresponding to a reactor rating in the 500 mw. (electrical) range.

Thorium blanket reactors

Figure 1:
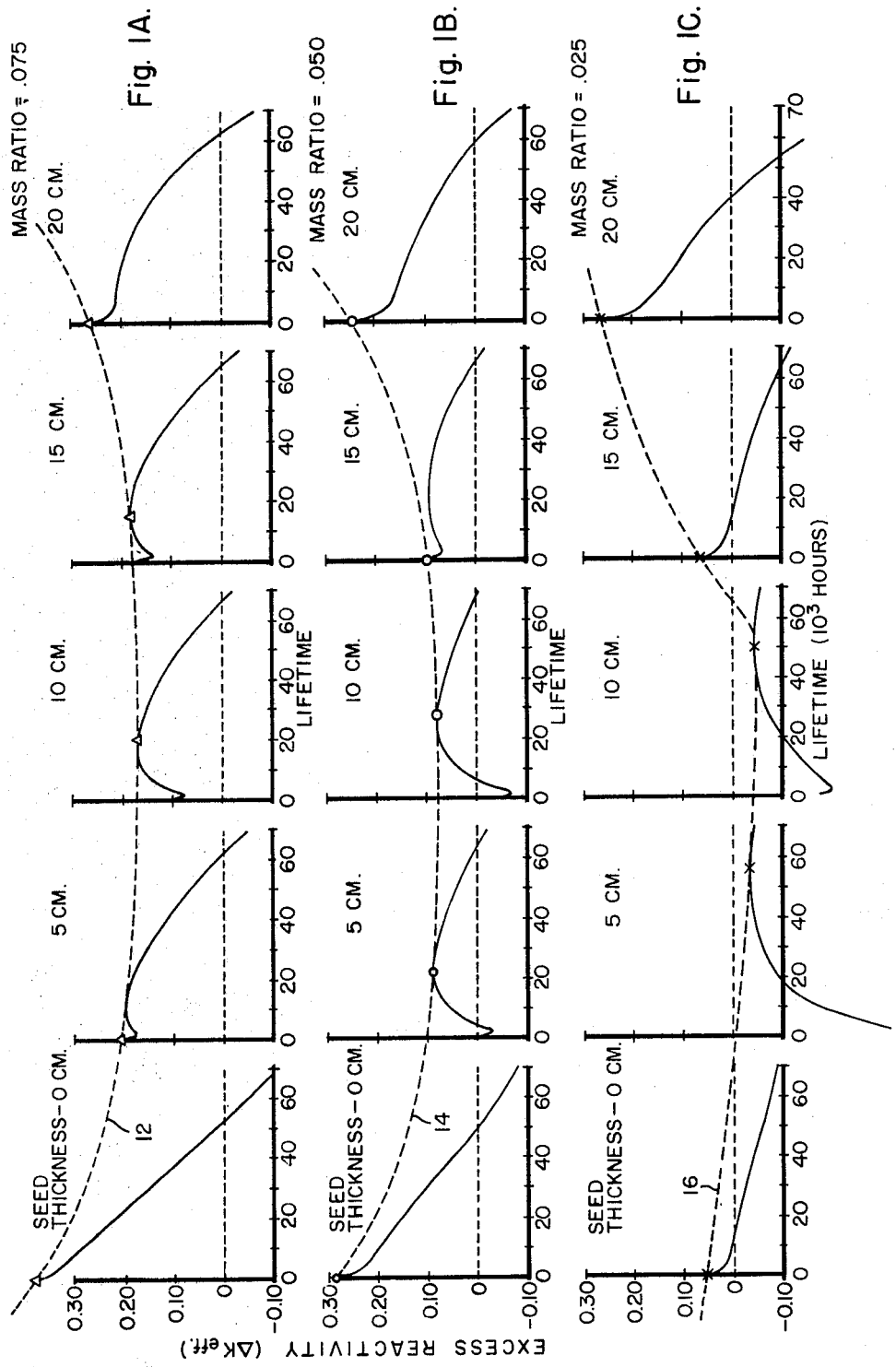

Referring now to FIG. 1 of the drawings, it will be seen that FIG. 1 comprises groups of graphs depicted as FIGS. 1A, 1B and 1C which teach the effects of a variation of the fuel ratio (fissile fuel/total fuel) and the effects of a variation in seed thickness on the excess reactivity (also referred to herein as control swing, control required, or $\Delta K_{\text{eff}}$) and lifetime for a seed blanket reactor. From the following Table I, it will be seen that the curves A, B, C, D and E of FIG. 1A depicts the effect described above for seed thicknesses of 0, 5, 10, 15 and 20 centimeters, respectively for a fuel ratio of .075.

TABLE I

| Curve | Seed Thickness (cm.) | Fuel Mass Ratio $\left(\frac{\text{Fissile Fuel}}{\text{Total Fuel}}\right)$ | Control Req'd. (Maximum) $\Delta K_{eff}$ | Lifetime (hrs.) |
|---|---|---|---|---|
| A | 0 | .075 | 0.40 | 53,000 |
| B | 5 | .075 | 0.21 | 61,500 |
| C | 10 | .075 | 0.17 | 66,000 |
| D | 15 | .075 | 0.18 | 65,500 |
| E | 20 | .075 | 0.27 | 62,500 |
| F | 0 | .050 | 0.29 | 50,000 |
| G | 5 | .050 | (1) | (1) |
| H | 10 | .050 | (1) | (1) |
| J | 15 | .050 | 0.10 | 64,500 |
| K | 20 | .050 | 0.25 | 58,000 |
| L | 0 | .025 | 0.05 | 16,000 |
| M | 5 | .025 | (2) | (2) |
| N | 10 | .025 | (2) | (2) |
| P | 15 | .025 | 0.06 | 13,500 |
| Q | 20 | .025 | 0.24 | 40,000 |

1 Negative excess reactivity early in life.
2 Negative excess reactivity throughout life.

Viewing curve A, it will be seen that for a seed of 0 thickness (i.e., a slightly enriched reactor) the maximum excess reactivity occurs at the beginning of life and is 0.40 $\Delta K_{eff}$. Thus, a control means for the reactor capable of absorbing a control swing of 0.40 $\Delta K_{eff}$ would be necessary to construct the reactor described by curve A. Similarly, where the seed thickness is 20 centimeters, as depicted by curve E of FIG. 1A, the excess reactivity occurs also at the beginning of life and is 0.28 $\Delta K_{eff}$. Viewing curves B, C and D, however, it will be appreciated that, as the seed thickness varies between 0 and 20 centimeters, the maximum excess reactivity or control required for a reactor decreases. Assuming a reactor capable of accommodating a control swing of 0.20 $\Delta K_{eff}$, it will be seen from curves C and D that reactors having a seed thickness between 10 and 15 centimeters can be expected to have a lifetime of about 65,000 hours.

In FIG. 1A, the curve 12 drawn in dotted lines passes through the points of maximum excess reactivity of each of the curves A, B, C, D and E. From curve 12, it will be appreciated that there exists an optimum range of seed thicknesses which acts to minimize the control needed for a given seed blanket reactor. FIGS. 1B and 1C illustrate the effect of a variation in the fuel ratio on the amount of control required for a seed blanket reactor and on the lifetime thereof. In FIG. 1B, the fuel ratio for the curves F, G, H, J and K is chosen to be 0.050. A fuel ratio of 0.025 is utilized for FIG. 1C and the curves L, M, N, P and Q are depicted thereon. Other parameters respecting curves F, G, H, J and K and curves L, M, N, P and Q of FIGS. 1B and 1C are set forth in detail in Table I.

The curve 14 of FIG. 1B is drawn through the points of maximum excess reactivity of curves F, G, H, J and K and is therefore similar to curve 12 of FIG. 1A. In addition, curve 16 is drawn through the points of maximum excess reactivity of curves L, M, N, P and Q. From curves 12, 14 and 16, it will be appreciated that the basic effect of decreasing the fuel ratio is to decrease the amount of control required for a given lifetime. Viewing the curves G and H of FIG. 1B, however, it will be seen that the lowering of the fuel ratio has at times an adverse effect on a reactor construction. It will be seen that the points 18 and 20 of curves G and H respectively depict the minimum excess reactivity of the reactors described by curves G and H early in life. Such minimum excess reactivity falls below the 0 point so that reactors constructed following the parameters for curves G and H will at some point early in life be unable to become critical. As a result, the reactor constructions of curves G and H cannot be utilized and such reactors have in effect a zero lifetime. Similarly, for curves M and N of FIG. 1C, there is no point in life wherein the reactor is capable of going critical while for curves L and P of FIG. 1C, the end of useful lifetime occurs at a relatively small time interval.

It is to be realized, of course, that the energy lifetime of reactors constructed pursuant to these (curve J for example) curves is of the order of $$25 \times 10^6 \frac{\text{mwd.}}{\text{m.t. } U^{235}}$$

The energy lifetime to the first refueling of present day seed-blanket reactors is of the order of $$10 \times 10^6 \frac{\text{mwd.}}{\text{m.t. } U^{235}}$$

It will be seen from curves 12, 14 and 16, that a decrease in the fuel ratio produces a decrease in the control requirement for a given seed thickness. Viewing FIGS. 1B and 1C, however, it will be further seen that by decreasing the fuel ratio too greatly, a reactor arrangement results wherein for certain seed thicknesses, the reactor will be unable to become critical at some point early in life. It will therefore be seen that there exists an optimum range of fuel ratios and seed thicknesses wherein the optimum fuel ratio must be matched with the optimum seed thickness in such a manner as to achieve a long lifetime and a decreased control swing for any given fuel loading.

Figure 2:
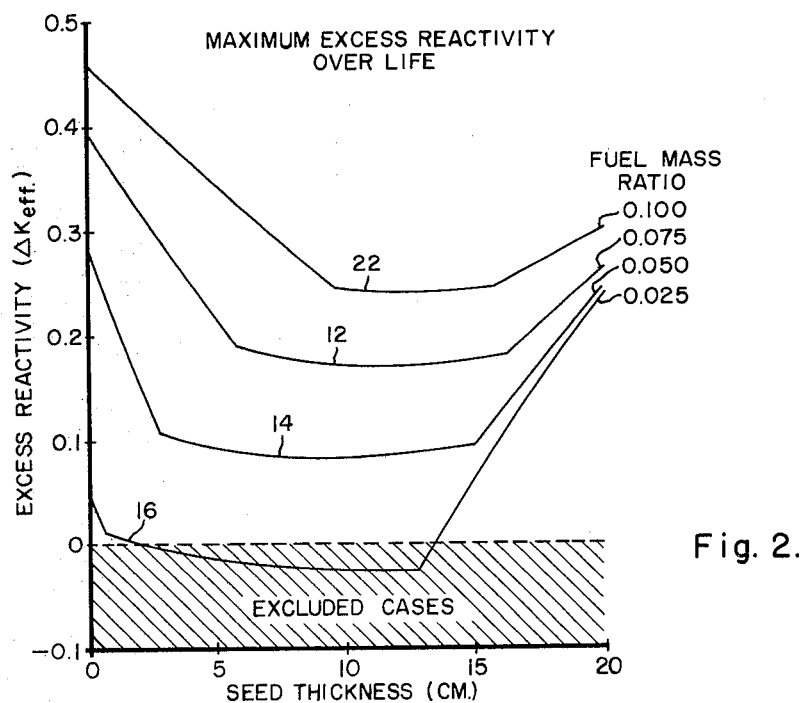
FIG. 2 is a graph summarizing the family of graphs of FIGS. 1A, 1B and 1C showing the effects of changes in fuel concentration and seed thickness on the maximum excess reactivity in a seed-blanket reactor during reactor lifetime.
Figure 3:
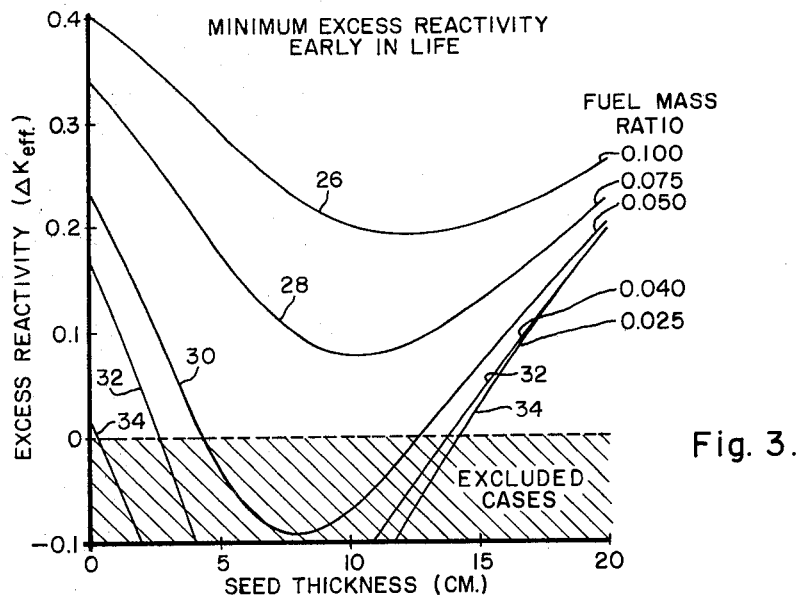
FIG. 3 is a graph showing the effects from changes in fuel concentration and seed thickness on the minimum excess reactivity occurring in a seed blanket reactor near the beginning of core life.

The graphs of FIGS. 2 and 3 summarize the above conclusions. More particularly, the graph of FIG. 2 comprises a plot of the curves 12, 14 and 16 of FIGS. 1A, 1B and 1C showing the effect of seed radius on control requirement or control swing for different fuel ratios. The curves 12, 14 and 16 of FIGS. 1A, 1B and 1C will be referred to by the same reference characters in FIG. 2. Viewing FIG. 2 and the summary of FIG. 2 in Table II it will be seen that, as pointed out above, a decrease in the fuel ratio and an optimization of the seed thickness produces a reactor wherein the amount of control required may be minimized.

TABLE II

| Curve No. | Fuel Mass Ratio $\left(\frac{\text{Fissile Fuel}}{\text{Total Fuel}}\right)$ | Seed Thickness at Minimum point (cm.) | Control required at Minimum point ($\Delta K_{eff}$) |
|---|---|---|---|
| 22 | 0.10 | 13 | 0.24 |
| 12 | 0.075 | 11 | 0.17 |
| 14 | 0.050 | 9 | 0.08 |
| 16 | 0.025 | 12 | Negative Value |

For curve 16 there exists a range of seed thicknesses wherein the reactor will never produce a positive excess reactivity.

The curves of FIG. 3 are illustrated herein to depict certain reactor constructions which are excluded because of the occurrence of a negative excess reactivity at some point early in life.

Viewing the curves B, C, D, G, H, J and N of FIGS. 1A, 1B and 1C, it is appreciated that where a geometry is chosen such that a seed thickness is within a predetermined optimum range with a fuel ratio within another predetermined optimum range, there occurs somewhere in the beginning of life a dip in the reactivity curve, as illustrated by points 18 and 20 of curves G and H, respectively. FIG. 3 comprises plottings of the low points or dips 18 and 20 for different fuel ratios and different seed thicknesses. The curves 26, 28, 30, 32 and 34 of FIG. 3 depict the provision of a seed blanket reactor having a fuel ratio of 0.10, 0.075, 0.05, 0.04, and 0.025, respectively. The vertical scale of the graph of FIG. 3 depicts control swing or change in core multiplication ($\Delta K_{eff}$) at points early in life. The horizontal scale shows a range of seed thicknesses from 0 to 20 centimeters. In considering a reactor design, it is necessary to determine whether the core multiplication dips below the zero point sometime early in life. In the event the latter condition occurs, the reactor can no longer sustain a control chain reaction and is inoperative. As a result of this phenomenon, the area of the graph of FIG. 3 below the zero $\Delta K_{eff}$ line, is hatched to illustrate the fact that reactors having seed thicknesses and fuel ratios which produce control swings below the zero line are inoperative and therefore comprise excluded cases. Table III depicts the range of excluded cases for the differing fuel ratios depicted by curves 26, 28, 30, 32 and 34.

TABLE III

| Curve No. | Fuel Ratio $\left(\dfrac{\text{Mass Fissile Fuel}}{\text{Mass Total Fuel}}\right)$ | Range of Seed Thickness excluded (cm.) |
| --- | --- | --- |
| 26 | 0.100 | None |
| 28 | 0.075 | None |
| 30 | 0.050 | 4.4–12.8 cm. |
| 32 | 0.040 | 2.6–13.8 cm. |
| 34 | 0.025 | Less than 14.0 cm. |

For example, if the fuel ratio is 0.10 or 0.075, there are no seed thicknesses which would be excluded because of a negative excess reactivity early in life. From curve 30, however, it will be seen that with a fuel ratio of 0.05, seed thicknesses varying between 4.4 and 12.8 centimeters must be excluded since the excess reactivity of the reactor early in life becomes negative.

It is to be realized, however, that the curves of FIGS. 2 and 3 identify cases which are undesirable by virtue of too great a control requirement or are excluded by virtue of a negative excess reactivity early in life.

Control considerations

The regions of exclusion and of high control swing requirements are summarized in the graph of FIG. 4 which comprises a cross plot of the graphs of FIGS. 2 and 3. More particularly in FIG. 4 there is plotted on the vertical axis varying mass ratio from 0 to 0.10. On the horizontal axis the quantity seed thickness is plotted and varies from 0 to 20 centimeters. As pointed out in Table IV, the curve 36 of FIG. 4 represents those points wherein the minimum excess reactivity early in life equals zero.

TABLE IV

| Curve No. | Locus for which Maximum Control Required during lifetime is: |
| --- | --- |
| 38 | 0.10 $\Delta K_{eff}$ |
| 40 | 0.15 $\Delta K_{eff}$ |
| 42 | 0.20 $\Delta K_{eff}$ |
| 44 | 0.25 $\Delta K_{eff}$ |
| 46 | 0.30 $\Delta K_{eff}$ |
| 36 | Locus for which Minimum excess reactivity early in life is zero. |

All points within the curve 36 are illustrated as crosshatched to depict excluded cases (similar to the excluded cases of FIG. 3) for reactors constructed having mass ratios and seed thicknesses which fall under the curve 36 will have a negative excess reactivity early in life. The curves 38, 40, 42, 44 and 46 depict ranges of mass ratios and seed thicknesses which require 0.10, 0.15, 0.20, 0.25 and 0.30 $\Delta K_{eff}$. Thus, a reactor designer, knowing the amount of control swing he desires to accommodate within his reactor design, can, by use of FIG. 4 determine a mass ratio and seed thickness which falls below the control capability of the reactor control scheme. In addition, the reactor designer will immediately know whether his choice of mass ratio and seed thicknesses are such as to produce a negative excess reactivity early in life (i.e., fall below the curve 36). From curve 38, it will be appreciated that the region of 10% control to some degree falls within the region of excluded cases and curve 38 is therefore depicted in two separate areas. In addition, curve 46 shows that where reactors capable of accommodating 0.30 $\Delta K_{eff}$ control are used, exceedingly high fuel ratios (in excess of 0.10) may be chosen for seed thicknesses greater than 7 centimeters.

Lifetime considerations

While the curves of FIG. 4 are helpful to the reactor designer from the standpoint of determining the amount of control required and determining those constructions which must be excluded, these curves do not provide information relative to the lifetime capability of reactors having selected seed thicknesses, mass ratios and control capability. The curves of FIG. 5 comprise an exact duplication of the graph of FIG. 4 having superimposed thereon loci of constant lifetime. Curves 48, 50, 52, 54 and 56 comprise the loci of constant lifetimes for reactor cores having lifetimes of 67,500, 65,000, 62,500, 60,000, and 50,000 hours respectively. The specific values for the curves of FIG. 5 are set forth in Table V.

TABLE V

| Curve No. | Maximum Control Required ($\Delta K_{eff}$) | Curve No. | Core Lifetime Obtainable (hours) |
| --- | --- | --- | --- |
| 36 | ----* | 48 | 67,500 |
| 38 | 0.10 | 50 | 65,000 |
| 40 | 0.15 | 52 | 62,500 |
| 42 | 0.20 | 54 | 60,000 |
| 44 | 0.25 | 56 | 50,000 |
| 46 | 0.30 | | |

*Curve 36 is the locus below which reactors have essentially zero lifetime.

In viewing FIG. 5, it will be seen that there exists a range of feasible reactor constructions wherein lifetimes in excess of 67,500 hours of full power can be achieved. Such lifetimes exceed by a substantial amount the maximum obtainable lifetimes for present day nuclear reactor cores. By utilizing FIG. 5, a reactor designer is able to determine the anticipated lifetime of the reactor construction for given seed thicknesses and fuel ratios and is also able to determine the amount of control swing necessary for the reactor. For example, if the reactor designer desires a lifetime in excess of 67,500 full power hours and desires to provide close to 0.10 $\Delta K_{eff}$ control, he may choose a seed thickness and mass ratio falling in the region adjacent curves 36, 38 and 48. The latter area is depicted by the reference character 58. In the event the reactor designer desires a 65,000 hour lifetime and is capable of providing control up to 0.20 $\Delta K_{eff}$, he may choose a reactor geometry having a mass ratio and seed thickness falling in the area between the curves 50 and 36. Depending upon the specific mass ratio and seed thickness, the amount of control may vary from lower than 0.10 $\Delta K_{eff}$ (between curves 38, 36 and 50) to approximately 0.19 $\Delta K_{eff}$. The curves of FIG. 5 point out that it is desirable to optimize seed thickness and mass ratio to minimize the control swing (the maximum excess reactivity during reactor lifetime) and still maximize reactor lifetime. For example, from curves 48, 50 and 52, it can be seen that as reactor lifetime is decreased, the amount of control required can be increased. Thus, there exists an optimization of the quantities mass ratio and seed thickness which produce not only longer lifetimes, but also decreases the amount of control required. According to FIG. 5, a maximum lifetime of 68,000 hours is obtainable at the point depicted by the reference character 60 wherein the control required is 0.12 $\Delta K_{eff}$ and the seed thickness is 11.5 centimeters with a mass ratio of 0.058.

Natural uranium and depleted uranium blankets

As pointed out previously, the blanket material utilized in forming the curves of FIGS. 4 and 5 was chosen to be thorium-232 having zero fissile enrichment. As will be seen in connection with FIGS. 6 and 7, in the event depleted uranium or natural uranium is utilized, there is a relatively small but positive fissile enrichment associated with the blanket. The effect of the existence of a fissile enrichment in the blanket region of the reactor would serve to reduce substantially the region of excluded cases (the area defined by the curve 36) of FIG. 5 and also to reduce the core lifetime.

Referring now to FIG. 6 of the drawings, there is plotted on the horizontal axis of the graph of FIG. 6, seed thickness, and mass ratio is plotted on the vertical axis. In the graph of FIG. 6, the composition of a blanket is chosen as natural uranium. With that one exception, all of the other constants and materials described in connection with the graphs of FIGS. 1 through 5 remain the same.

The curve 90 of FIG. 6 defines an area which depicts a region of excluded seed thicknesses and mass ratios which will not permit a reactor to remain critical throughout its entire lifetime. Each of the curves 92, 94, 96, 98, 100 and 102 depict the amount of control required ($\Delta K_{eff}$) for different mass ratios and seed thicknesses. The latter curves may therefore be considered to be the loci of different control requirements, as set forth in detail in Table VI. Similarly, the curves 108, 110, 112, 114 and 116 depict the loci of constant lifetimes, as set forth in detail in Table VI.

TABLE VI.—NATURAL URANIUM BLANKET

| Curve No. | Control Required ($\Delta K_{eff}$) | Curve No. | Lifetime (Hrs.) |
| --- | --- | --- | --- |
| 90 | ----* | 108 | 45,000 |
| 92 | 0.10 | 110 | 50,000 |
| 94 | 0.15 | 112 | 55,000 |
| 96 | 0.20 | 114 | 57,000 |
| 98 | 0.25 | 116 | 58,000 |
| 100 | 0.30 | | |
| 102 | 0.35 | | |

*Curve 90 represents those points wherein minimum excess reactivity of seed early in life equals zero.

Thus, a reactor designer, using the graph of FIG. 6 may determine the desired lifetime, control requirement, mass ratio and seed thickness which satisfies the requirements for a given reactor construction utilizing a natural uranium blanket. For example, if the reactor designer can accommodate a $\Delta K_{eff}$ of 0.20, then his reactor design must have a seed thickness and mass ratio falling between the curves 96 and 90 of FIG. 6. If the reactor designer desires a lifetime of at least 45,000 hrs., then the mass ratio and seed thicknesses would be chosen to fall between the curves 96 and 108 of FIG. 6. Similarly if a lifetime in excess of 50,000 hrs. is desired, then the reactor designer would choose a seed thickness and mass ratio falling within the area defined by curves 96 and 110.

Comparing the curves of FIG. 6 with the curves of the graph of FIG. 5, it will be appreciated that the region of excluded reactor cases as defined by the cross-hatched area below the curve 90 is substantially smaller than the corresponding region defined by the curve 36 of FIG. 5. As has been explained, the excluded region with a natural uranium blanket is smaller because of the fissile content of natural uranium. A concurrent effect with the provision of fissile material in the blanket region is also seen when the loci of constant lifetime (curves 108, 110, 112, 114 and 116) are considered. It is immediately obvious that the increase of the lifetime of the reactor core with a natural uranium blanket requires an increase in the control capability of a reactor; while from FIG. 5, it can be seen that an increased lifetime can be obtained with a much smaller increase in control capability. In addition, it will be seen that to obtain a lifetime of 55,000 hrs., it is necessary to have a control capability of about 0.23 $\Delta K_{eff}$. With a thorium blanket, lifetimes in excess of 67,500 hrs., can be obtained with less than 0.10 $\Delta K_{eff}$ (see the area subtended by curves 48, 38 and 36 of FIG. 5).

FIG. 7 is a graph similar to FIGS. 5 and 6 wherein the blanket material comprises depleted uranium (uranium containing approximately 0.22% fissile material). From FIG. 7 it will be seen that the curve 120 defines the region of excluded cases and the curves 122, 124, 126, 128, 130 and 132 each depict the locus of the control requirements for different $\Delta K_{eff}$. The curves 140, 142, 144 and 146 of FIG. 7 identify the loci of constant life-times for reactors constructed pursuant to the teachings of the invention. For detailed definition of the above curves, reference may be had to the following Table VII.

TABLE VII.—DEPLETED URANIUM BLANKET

| Curve No. | Control Required ($\Delta K_{eff}$) | Curve No. | Lifetime (Hrs.) |
| --- | --- | --- | --- |
| 120 | ----* | 140 | 45,000 |
| 122 | 0.10 | 142 | 50,000 |
| 124 | 0.15 | 144 | 55,000 |
| 126 | 0.20 | 146 | 57,000 |
| 128 | 0.25 | | |
| 130 | 0.30 | | |
| 132 | 0.35 | | |

*Curve 120 represents those points wherein minimum excess reactivity of seed early in life equals zero.

From FIG. 7 and Table VII, it will be appreciated that the region of excluded cases for the depleted uranium blanket is larger than the excluded cases of the natural uranium blanket, but is still substantially smaller than the excluded cases for a thorium blanket.

It will be further appreciated that the loci of constant lifetimes of FIG. 7 indicate that as lifetime is increased, the minimum control capability of the reactor must be increased. Thus the latter effect exists for the depleted uranium blanket, the natural uranium blanket, and the thorium blanket, but for a thorium blanket, as lifetime increases, the increase in control requirement is least.

If a depleted uranium blanket is utilized, the reactor designer may choose a suitable mass ratio and seed thickness which falls within the desired control capability for the reactor design and may thereby determine the lifetime of the reactor design. The reactor designer who desires to construct a reactor having a control capability of 0.20 $\Delta K_{eff}$ would choose a mass ratio and seed thickness falling between the curves 126 and 120 of FIG. 7. If the reactor design calls for a lifetime in excess of 50,000 hrs. with a 0.20 $\Delta K_{eff}$ control capability, then the mass ratio and seed thickness must be chosen to fall within the area between curves 120 and 126 and above 142. It will be appreciated that whereas a lifetime of 55,000 hrs. requires 0.23 $\Delta K_{eff}$ for a natural uranium blanket, that lifetime can be obtained with only 0.15 $\Delta K_{eff}$ with a depleted uranium blanket. (Again note that the same total fissile content is assumed in both cases.)

A direct comparison between the Shippingport Reactor and reactors constructed pursuant to this invention cannot be made for a number of reasons. With the first reactor core at Shippingport, a natural uranium blanket was utilized with the mass ratio of fissile to fissile plus fertile fuel being 0.013. The seed thickness at Shippingport was 14 centimeters, however, the reactor core geometry (single annular seed) at Shippingport was not such as to provide the uniformity of exposure of the blanket to the seed required by this invention. The use of a suitable geometry can best be expressed, as heretofore pointed out, as a seed-blanket geometry wherein the peak to average burnup in the reactor blanket is less than 2.5. Another factor which prevents direct comparison of the Shippingport reactor and the reactors of the present invention is the rate at which the core is driven. This rate may be considered as the power-to-fissile mass ratio $$\frac{\text{megawatts}}{\text{metric ton U}^{235}}$$

In the Shippingport reactor the core was designed with a power-to-fissile mass ratio of 1390 mw./m.t. $U^{235}$ while with the examples of the instant invention the ratio is 385 mw./m.t. $U^{235}$. If the Shippingport reactor were designed pursuant to this invention, there would necessarily be a change in core geometry to provide a sufficiently close coupling between the seed and blanket. Then the mass ratio and seed thickness could be optimized to provide an extended core lifetime for any given power per unit fissile mass.

*Suitable seed-blanket geometries*

Referring now to the schematic reactor core cross sections of FIGS. 8, 9 and 10, it will be appreciated that a reactor geometry must be chosen which produces the mass ratio between the fissile and fertile fuel within the desired ranges and with the peak to average burnup in the blanket less than or equal to 2.5. It will be appreciated that so long as a geometry is chosen wherein the mass ratio falls within the desired range, wherein the seed and blanket are closely coupled and wherein the seed thickness is maintained within the desired range, any geometrical arrangement of seeds and blankets is suitable. The arrangements of FIGS. 8, 9 and 10 merely comprise a number of illustrative embodiments of seed blanket core cross sections which permit a wide range of mass ratios, of closely coupled seeds and blankets and of seed thicknesses. In the arrangement of FIG. 8 there are provided a plurality of separate modules designated by the reference characters 62 with each module having a squared cross section and a reactor core including 45 modules 62. Each module 62 includes a central seed 64 of generally squared cross section wherein the fissile material is located. Surrounding each seed 64 is a blanket region 66 of generally annular cross section and containing the fertile material. Disposed within each seed region 66 is a suitable reactor control means such as a movable control rod 68 illustrated herein of cruciform cross section. It will therefore be appreciated that the seed thickness of each of the seeds 64 are suitably chosen within the range of thicknesses permitting the desired control swing and desired core lifetime. Similarly, the mass ratio is suitably chosen such that the ratio of fissile material in the seed to the mass of total fuel per assembly 62 is within the predetermined range. In the arrangement of FIG. 9, each of the modules or assemblies is desirably formed of hexagonal cross section and designated by the reference character 70. Thirty-seven modules 70 form the reactor core of FIG. 9. Each of the hexagonally cross sectioned modules 70 includes a central seed region 72 of generally circular cross section and a cruciform control rod 74 disposed within each seed 72. The reactor core is built up from interfitting the hexagonal modules 70.

It will be appreciated that the geometry of FIG. 9 wherein a circular seed 72 surrounded by a generally annular blanket 76 having a hexagonal outer periphery was utilized as the exemplary module shape for the formation of the graphs of FIGS. 1 through 7 hereof. Each of the blanket regions 76 was chosen to comprise thorium-232, in the form of thorium oxide, having zero fissile fuel enrichment.

Still another reactor core cross section is illustrated in FIG. 10 wherein 37 hexagonal modules 80 form the reactor core. In the example of FIG. 10, each of the seeds comprises an annular region 82 surrounded at its outer periphery by an outer blanket region 84. In the openings of the annular seeds 82 there are provided central cores 86 of the blanket material. The control means in this example of the invention is formed by moving control rods 88 with each control rod 88 comprising a circular segment and three such segments 88 being disposed in each seed 82.

It will be appreciated that many other geometrical arrangements which produce the desired mass ratio and the desired seed thickness can be utilized and that many different types of control methods and fissile and fertile materials can be substituted for the specific examples discussed herein without departing from the broad spirit and scope of this invention. Accordingly, it is specifically intended that the examples of the invention discussed in detail herein be interpreted as illustrative of this invention rather than limitative thereof.

I claim as my invention:

1. In a seed-blanket reactor moderated by a hydrogenous medium, a core arrangement having an extensive lifetime, said reactor having a plurality of spaced seed regions, a blanket region surrounding each of said seed regions, said blanket region being fueled with thorium-232 and said seed regions being fueled with uranium-235, said reactor having a geometry wherein the mass ratio of uranium-235 to uranium-235 plus thorium-232 and the thickness of each seed are selected from values lying between the curves 48 and 36 of FIG. 5 hereof and wherein said seed regions are dependently critical, and said seed and blanket regions being relatively positioned such that the peak to average blanket burnup is less than 2.5.

2. In a seed-blanket reactor moderated by a hydrogenous medium, a core arrangement having an extensive lifetime, said reactor having a plurality of spaced seed regions and a blanket region surrounding each of said seed regions, said blanket region being fueled with natural uranium and said seed regions being fueled with uranium-235, said reactor having a geometry wherein the mass ratio of uranium-235 to uranium-235 plus natural uranium and the thickness of each seed are selected from values lying between the curves 98 and 108 of FIG. 6 hereof and wherein said seed regions are dependently critical, and said seed and blanket regions being relatively positioned such that the peak to average blanket burnup is less than 2.5.

3. In a seed-blanket reactor moderated by a hydrogenous medium, a core arrangement having an extensive lifetime, said reactor having a plurality of spaced seed regions and a blanket region surrounding each of said seed regions, said blanket region being fueled with depleted uranium and said seed regions being fueled with uranium-235, said reactor having a geometry wherein the mass ratio of uranium-235 to uranium-235 plus depleted uranium and the thickness of each seed are selected from values lying between the curves 126 and 140 of FIG. 7 hereof and wherein said seed regions are dependently critical, and said seed and blanket regions being relatively positioned such that the peak to average blanket burnup is less than 2.5.

4. In a seed-blanket reactor moderated by a hydrogenous medium, a core arrangement having an extensive lifetime, said reactor having a plurality of spaced seed regions and a blanket region surrounding each of said seed regions, said blanket region being fueled with thorium-232 and said seed regions being fueled with uranium-235, said reactor having a geometry wherein the mass ratio of uranium-235 to uranium-235 plus thorium-232 and the thickness of each seed are selected from values lying between the curves 50 and 36 of FIG. 5 hereof and wherein said seed regions are dependently critical, and said seed and blanket regions being relatively positioned such that the peak to average blanket burnup is less than 2.5.

5. In a seed-blanket reactor moderated by a hydrogenous medium, a core arrangement having an extensive lifetime, said reactor having a plurality of spaced seed regions a blanket region surrounding each of said seed regions, said blanket region being fueled with natural uranium and said seed regions being fueled with uranium-235, said reactor having a geometry wherein the mass ratio of uranium-235 to uranium-235 plus natural uranium and the thickness of each seed are selected from values lying between the curves 96 and 90 of FIG. 6 hereof and wherein said seed regions are dependently critical, and said seed and blanket regions being relatively positioned such that the peak to average blanket burnup is less than 2.5.

6. In a seed-blanket reactor moderated by a hydrogenous medium, a core arrangement having an extensive lifetime, said reactor having a plurality of spaced seed regions and a blanket region surrounding each of said seed region, said blanket region being fueled with depleted uranium and said seed regions being fueled with uranium-235, said reactor having a geometry wherein the mass ratio of uranium-235 to uranium-235 plus depleted uranium and the thickness of each seed are selected from values lying between the curves 126 and 120 of FIG. 7 hereof and wherein said seed regions are dependently critical, and said seed and blanket regions being relatively positioned such that the peak to average blanket burnup is less than 2.5.

7. In a seed-blanket reactor moderated by a hydrogenous medium, a core arrangement having a maximum $\Delta K_{eff}$ during its lifetime less than 0.20, said reactor having a plurality of spaced seed region and a blanket region surrounding each of said seed region, said blanket region being fueled with thorium-232 and said seed regions being fueled with uranium-235, said reactor having a geometry wherein the mass ratio of uranium-235 to uranium-235 plus thorium-232 and the thickness of each seed are selected from values lying between the curves 42, 56 and 36 of FIG. 5 hereof and wherein said seed regions are dependently critical, and said seed and blanket regions being relatively positioned such that the peak to average blanket burnup is less than 2.5.

8. In a seed-blanket reactor moderated by a hydrogenous medium, a core arangement having a maximum $\Delta K_{eff}$ during its lifetime less than 0.15, said reactor having a plurality of spaced seed regions and a blanket region surrounding each of said seed regions, said blanket region being fueled with natural uranium and said seed regions being fueled with uranium-235, said reactor having a geometry wherein the mass ratio of uranium-235 to uranium-235 plus natural uranium and the thickness of each seed are selected from values lying between the curves 94 and 90 of FIG. 6 hereof and wherein said seed regions are dependently critical, and said seed and blanket regions being relatively positioned such that the peak to average blanket burnup is less than 2.5.

9. In a seed-blanket reactor moderated by a hydrogenous medium, a core arangement having a maximum $\Delta K_{eff}$ during its lifetime less than 0.15, said reactor having a plurality of spaced seed regions and a blanket region surrounding each of said seed regions, said blanket region being fueled with depleted uranium and said seed regions being fueled with uranium-235, said reactor having a geometry wherein the mass ratio of uranium-235 to uranimum-235 plus depleted uranium and the thickness of each seed are selected from values lying between the curves 124 and 120 of FIG. 7 hereof and wherein said seed regions are dependently critical, and said seed and blanket regions being relatively positioned such that the peak to average blanket burnup is less than 2.5.

10. In a seed-blanket reactor moderated by a hydrogenous medium, a core arrangement having an extensive lifetime, said reactor having a plurality of spaced seed regions and a blanket region surrounding each of said seed regions, said blanket region being fueled with thorium-232 and said seed regions being fueled with uranium-235, said reactor having a geometry wherein the mass ratio of uranium-235 to uranium-235 plus thorium-232 is between 0.062 and 0.075, said seed regions each having a thickness greater than 8 centimeters and less than 15 centimeters and wherein said seed regions are dependently critical, and said seed and blanket regions being relatively positioned such that the peak to average blanket burnup is less than 2.5.

11. In a seed-blanket reactor moderated by a hydrogenous medium, a core arrangement having an extensive lifetime, said reactor having a plurality of spaced seed regions and a blanket region surrounding each of said seed regions, said blanket region being fueled with natural uranium and said seed regions being fueled with uranium-235, said reactor having a geometry wherein the mass ratio of uranium-235 to uranium-235 plus natural uranium is between 0.025 and 0.035, said seed regions each having a thickness greater than 3 centimeters and less than 13 centimeters and wherein said seed regions are dependently critical, and said seed and blanket regions being relatively positioned such that the peak to average blanket burnup is less than 2.5.

12. In a seed-blanket reactor moderated by a hydrogenous medium, a core arrangement having an extensive lifetime, said reactor having a plurality of spaced regions and a blanket region surrounding each of said seed regions, said blanket region being fueled with depleted uranium and said seed regions being fueled with uranium-235, said reactor having a geometry wherein the mass ratio of uranium-235, to uranium-235 plus depleted uranium is between 0.031 and 0.042, said seed regions each having a thickness greater than 2.5 centimeters and less than 16 centimeters and wherein said seed regions are dependently critical, and said seed and blanket regions being relatively positioned such that the peak to average blanket burnup is less than 2.5.

13. In a seed-blanket reactor moderated by a hydrogenous medium, a core arrangement having an extensive lifetime, said reactor having a plurality of spaced seed regions and a blanket region surrounding each of said seed regions, said blanket region being fueled with thorium-232 and said seed region being fueled with uranium-235, said reactor having a geometry wherein the mass ratio of uranium-235 to uranium-235 plus thorium-232 is approximately 0.058, said seed regions each having a thickness of approximately 11.5 centimeters and wherein said seed regions are dependently critical, and said seed and blanket regions being relatively positioned such that the peak to average blanket burnup is less than 2.5.

References Cited by the Examiner

UNITED STATES PATENTS

| | | | |
|---|---|---|---|
| 2,870,076 | 1/1959 | Koch | 176—17 |
| 3,154,471 | 10/1964 | Radkowsky | 176—17 |
| 3,158,543 | 11/1964 | Shermon et al. | 176—17 |

REUBEN EPSTEIN, *Primary Examiner.*

L. DEWAYNE RUTLEDGE, *Examiner.*

J. V. MAY, *Assistant Examiner.*